(12) United States Patent
Harris et al.

(10) Patent No.: US 7,170,883 B2
(45) Date of Patent: Jan. 30, 2007

(54) INFORMATION ENCODING AND DECODING METHOD

(75) Inventors: John M. Harris, Chicago, IL (US); Ronald T. Crocker, St. Charles, IL (US); Eric K. Crane, Wheaton, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/213,852

(22) Filed: Aug. 7, 2002

(65) Prior Publication Data

US 2004/0028010 A1 Feb. 12, 2004

(51) Int. Cl.
*H04J 3/24* (2006.01)

(52) U.S. Cl. ........................................ 370/349; 370/328

(58) Field of Classification Search ............. 370/310.2, 370/328, 336, 338, 347, 349, 321, 314, 458, 370/313, 524, 522; 340/7.51, 7.53, 7.52
See application file for complete search history.

(56) References Cited

U.S. PATENT DOCUMENTS

| | | | |
|---|---|---|---|
| 5,574,439 A * | 11/1996 | Miyashita | 340/825.44 |
| 5,640,682 A * | 6/1997 | Wagai et al. | 340/7.51 |
| 5,703,934 A | 12/1997 | Zicker et al. | |
| 5,784,001 A * | 7/1998 | Deluca et al. | 340/825.44 |
| 5,822,307 A | 10/1998 | Eastmond et al. | |
| 5,872,523 A | 2/1999 | Dellaverson et al. | |
| 5,886,646 A * | 3/1999 | Watanabe et al. | 340/825.44 |
| 5,940,381 A | 8/1999 | Freeburg et al. | |
| 6,085,232 A | 7/2000 | Kikinis | |
| 6,088,337 A | 7/2000 | Eastmond et al. | |
| 6,128,287 A | 10/2000 | Freeburg et al. | |
| 6,282,183 B1 | 8/2001 | Harris et al. | |
| 6,339,588 B1 | 1/2002 | Katsuragawa | |

* cited by examiner

*Primary Examiner*—Brenda Pham

(57) ABSTRACT

Portions of transmitted messages, such as a portion of a service option field, can include a coded representation. The coded representation can correlate to previously stored information as retained at a receiving unit. Upon receiving the coded representation, the receiving unit can use it to access a specific item of previously stored information and then use that information. For example, a previously stored text message can be displayed and/or special annunciation tones can be used to signify specific events, such as the initiation of an interconnect or dispatch call type prior to actual complete initiation of such a call. In one embodiment, a relative station of transmission as corresponds to the coded representation can also be used to further aid in correlating the coded representation to a specific item of information.

11 Claims, 4 Drawing Sheets

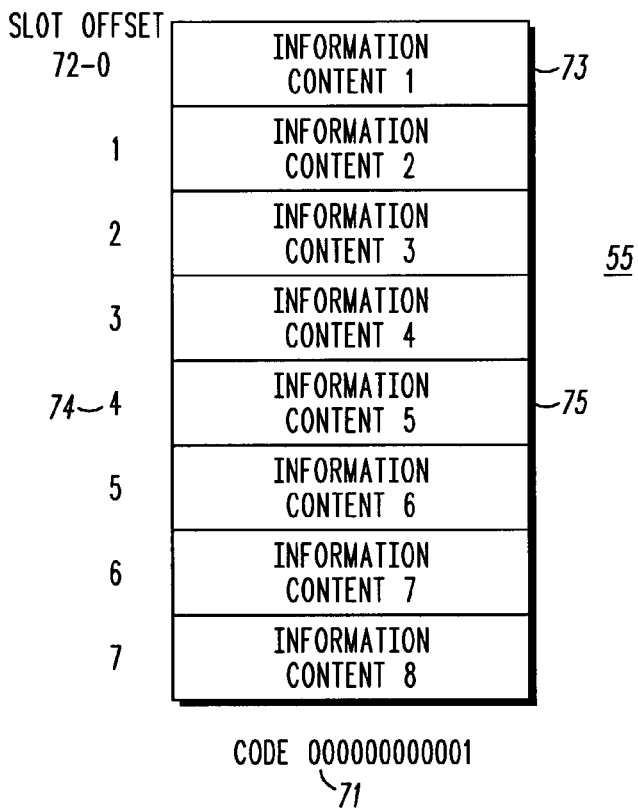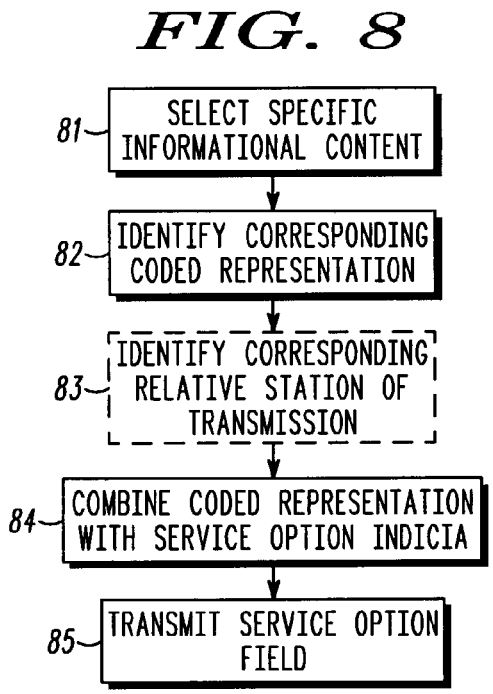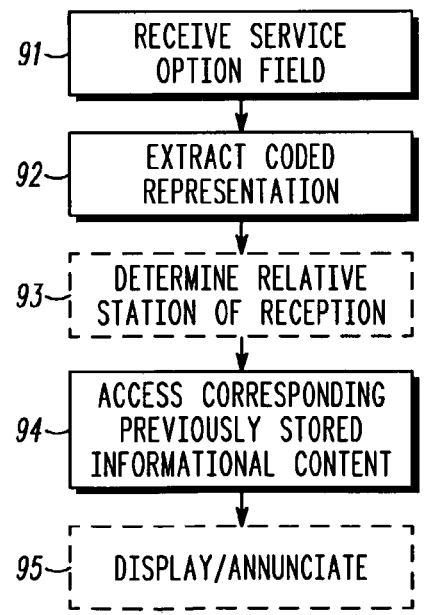

INFORMATION ENCODING AND DECODING METHOD

TECHNICAL FIELD

This invention relates generally to communications systems, and more particularly to the transmission and reception of coded representations.

BACKGROUND

Communication systems, such as wireless communication systems, are well known in the art. Many such systems, such as CDMA2000 systems, are relatively sophisticated and offer a wide variety of potential services and call types, including wireless telephony, dispatch, and short message service, to name a few. A relatively constant design imperative for such systems has been the accommodation of as many users as possible. Towards this end, system designers often seek to minimize required system resource needs for the communications that are facilitated by the system. For example, minimizing resource requirements (such as air time and/or bandwidth) to support the transmission of a given quanta of information is usually desirable as the saved resources can be used to support additional calls. As another example, minimizing required or typical non-user payload usage of any given communication resource is also usually desirable.

The incorporation of varied services promotes, to some extent, a potential reduction in overall system resource needs for a given user population. For example, offering short message services offers the potential to avoid at least some telephonic service call types (with short data messages usually requiring fewer system resources). At the same time, however, the same continuing need to reduce yet further overall system resource requirements to support a given user base still exists.

BRIEF DESCRIPTION OF THE DRAWINGS

The above needs are at least partially met through provision of the information encoding and decoding method described in the following detailed description, particularly when studied in conjunction with the drawings, wherein:

FIG. 7 comprises a schematic diagram of information content as correlated to both coded representations and a relative station of transmission as configured in accordance with an embodiment of the invention;

FIG. 8 comprises a flow diagram for transmitting information as configured in accordance with an embodiment of the invention;

FIG. 9 comprises a flow diagram for receiving information as configured in accordance with an embodiment of the invention.

Figure 1:
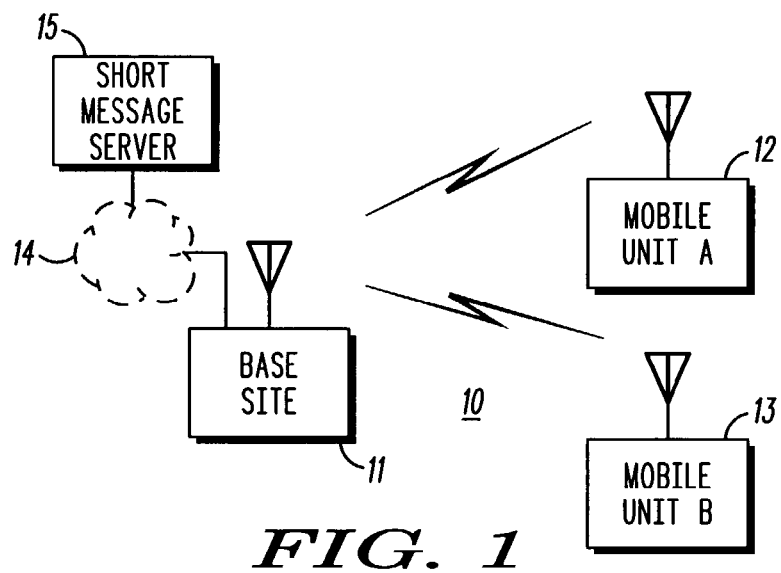
FIG. 1 comprises a block system diagram as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a coded representation is correlated with informational content that is stored at the intended reception target. Upon receiving the coded representation, the reception target utilizes the coded representation to ascertain the informational content. That information can serve various purposes, including imparting various kinds of data to the user and/or to otherwise facilitate the operation of the reception target within the communication system.

In one embodiment, a defined service option field includes the coded representation. A portion of the service option field continues to represent service option information while a remaining portion presents the coded representation (or representations). So configured, in a system such as CDMA2000, literally tens of thousands of discrete informational items can be readily represented in this fashion. In another embodiment, individual information items are correlated to both a given coded representation and a relative station of transmission. For example, a given coded representation will correlate to a first information item when transmitted using a first relative station of transmission but will correlate to a second information item when transmitted using a second relative station of transmission. In one embodiment, the relative station of transmission includes a given time slot within which the coded representation is transmitted.

Such coded representations can serve to reduce system requirements in a variety of ways. Considerable bandwidth can be preserved, for example, simply by permitting the coded representations to facilitate the imparting of various text messages of potentially considerable length and/or complexity. In this regard, the specific items of information that correlate to specific coded representations can vary on a user by user basis to increase yet further the effective compression of this approach.

If desired, such coded representations can be used to facilitate or shorten the time required to engage a user in a given new call. In particular, by using the coded representation to provide information unique to an originator of a new call of a particular call type, the communication unit can initiate a unique annunciation sequence that solely corresponds to the particular call type while, at least partially in parallel also moving to a traffic channel and participating in a handshake protocol to otherwise facilitate the particular call type. So configured, the receiving party can be alerted to the new call prior to the new call actually being set up on the traffic channel.

This pre-alert can be used by the receiving party in a variety of ways. For example, the receiving party can ready themselves to engage in the communication. This small behavior modification on the part of the user, intuitively driven by the unique annunciation tone, can result in significant system-wide savings in overall channel usage. As another example, the receiving unit can display retrieved information as corresponds to the coded representation prior to the completion of the call set-up (the information displayed could be a telephone number of the calling party, an email address for the calling party, and/or an email subject header, for example). Such information could again be used by a receiving party to good advantage prior the actual completion of the call set-up process.

Referring now to the drawings, and in particular to FIG. 1, the essential concepts taught herein can be practiced in a wide variety of communication systems and networks. For purposes of illustrating these concepts, a wireless communication system 10, such as a CDMA2000 system, has one or more base sites 11 that service communications between various mobile units 12 and 13 and other parties and services (such as other mobile parties and/or landline parties). For example, the base site 11 can couple through a network 14 of choice to permit messages as sourced by a short message server 15 to be transmitted to one or more of the mobile units. Such systems are generally well understood in the art and hence additional details will not be presented here for the sake of brevity and the preservation of focus.

Figure 2:
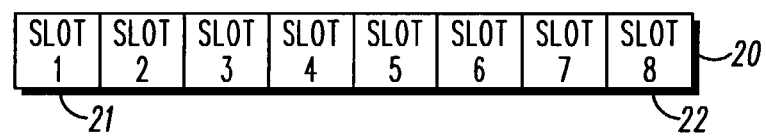
FIG. 2 comprises a schematic view of a time slotted communications channel as configured in accordance with an embodiment of the invention.

In such a system 10, a given radio frequency resource can be time division multiplexed (in addition to such other multiplexing, such as frequency division multiplexing or code division multiplexing, as may be simultaneously used). For example, with reference to FIG. 2, a channel can be subdivided by time into a plurality of slots such as the eight slots 20 shown. The frame begins with a first slot 21 and concludes with an eighth slot 22. In this particular embodiment, the entire content of these slots may all be dedicated to control channel contents or to a mixture of control channel content and user payload. The slots themselves are substantially synchronized such that they are transmitted at a time that is substantially predictable by various participants within the system. (It will be understood that the number of slots can vary by need and system requirements. In fact, many systems will utilize more than eight slots. For purposes of simplicity, however, only eight are shown in this example.)

Figure 3:
FIG. 3 comprises a schematic view of a control channel as configured in accordance with an embodiment of the invention.
Figure 4:
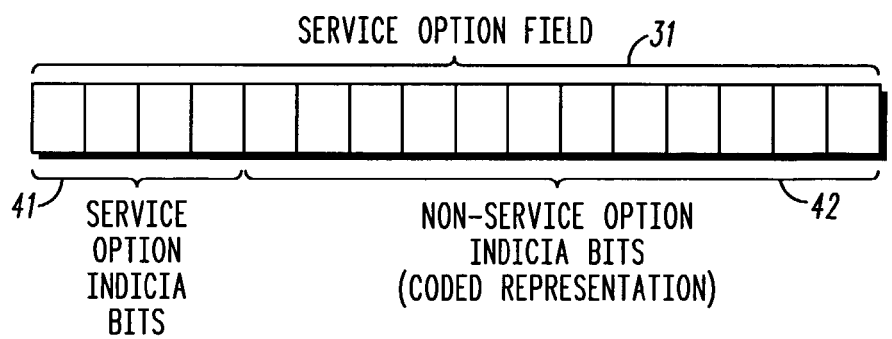
FIG. 4 comprises a schematic view of a service option field as configured in accordance with an embodiment of the invention.

As noted, each such slot 20 includes some control channel content. Referring to FIG. 3, pursuant to many of these embodiments, each control channel 30 includes at least a service option field 31 and, preferably, other data as well 32. These control channel features are generally well understood in the art and further details will not be provided here except where helpful to further explain a particular embodiment. For purposes of these illustrative embodiments, the service option field 31 will comprise sixteen bits are shown in FIG. 4. The purpose of the service option field 31 within a system such as CDMA2000 is to provide a space where protocol information specific to a given call can be presented. For example, the service option field 31 can be used pursuant to current practice to indicate that a given call is to be a voice call (using a particular type of vocoder) or a data call. In general, although sixteen bits have been provided for such a field 31, only a very few service options have actually been defined and assigned. Accordingly, a large portion of the remainder of the service option field 31 is presently essentially unused.

Pursuant to this embodiment, then, a portion of the service option field 3 1 continues to be reserved for service option indicia bits 41 and a remaining portion of the service option field 31 now serves to retain non-service option indicia bits 42. In particular, as explained below in more detail, the non-service option indicia bits 42 can comprise a coded representation. Preferably, a substantial portion of the service option field 31 is now partitioned for containment of code representations. In the embodiment depicted, four bits remain reserved for the service option indicia and the remaining twelve bits are available for one or more coded representations. Such an apportionment leaves space for tens of thousands of coded representations.

Figure 5:
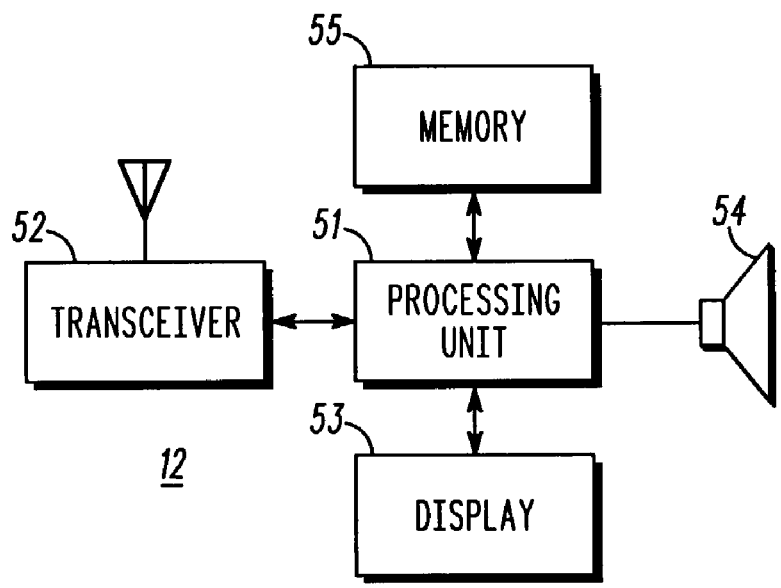
FIG. 5 comprises a block diagram of a mobile unit as configured in accordance with an embodiment of the invention.

As will be shown below, such coded representations as contained within a service option field as comprised as part of a control channel are sourced by infrastructure of the system and are received and used by mobile units 12. With reference to FIG. 5, such mobile units can comprise a wide variety of user platforms but many will typically include a processing unit 51 (such as a microprocessor, microcontroller, programmable gate array, or other logic based programmable platform) that operates in conjunction with a transceiver 52 that is compatible with the communications medium of the system 10 as well understood in the art. In addition, such mobile units 12 can include a display 53 and an audible annunciator 54. Also, one or more memories 55 will also usually be provided. In addition to storing operating software and/or operational parameters for the mobile unit 12, such memory 55 can also be used to contain the informational content and correlated coded representations as described further below. So configured, the mobile unit 12 can display information that is retrieved from the memory 55 and the annunciator 54 can provide specific sounds in accordance with various coded representations as are received and interpreted by the mobile unit 12.

Figure 6:
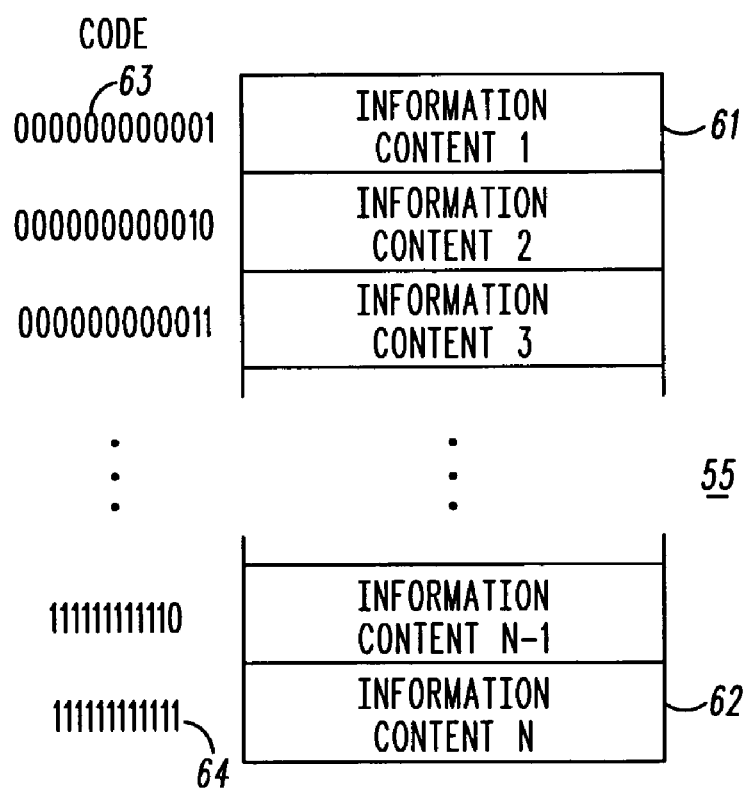
FIG. 6 comprises a schematic diagram of coded representations as correlated to information content as configured in accordance with an embodiment of the invention.

It has been mentioned already that a coded representation can be used as a key to direct a receiving unit to a corresponding item of informational content. There are various ways in which this can be done. Pursuant to one embodiment, and referring now to FIG. 6, each discrete coded representation can correlate to a unique item of informational content. For example, a first code 63 comprising, for example, the bit sequence "000000000001" can correspond to a first item of information content 61 and to no other item of information content. Similarly, another bit sequence 64 comprising the values "111111111111" can correspond uniquely to an Nth item of information content. In these examples, the information content items can comprise alphanumeric information (including text), graphic items, sound files, or any other information imparting indicia or medium. In general, the information content itself and the corresponding relationships with various codes will be predetermined and stored, at least in part, at both the infrastructure side of the system 10 and the mobile unit side.

As a simple example, the first information content item 61 noted above could comprise the text message, "ABC stock has risen by." By sending the corresponding code 63, this informational content could essentially be conveyed to a mobile user. Upon receipt, the code 63 would be used to recover the indicated message 61 from memory and then, in this example, displayed. A wide variety of textual messages can be accommodated in this fashion. It should also be noted that, in this example, the information content item 61 is incomplete. If desired, the coded representation 61 could be sent with, for example, an argument comprising a value to place at the conclusion of the information content. For example, the value "1.5" could be transmitted as such an argument. The receiving unit could then use the code 63 to recover the message "ABC stock has risen by" and then combine that recovered message with the argument "1.5" to yield the complete message, "ABC stock has risen by 1.5." So configured, an even wider variety of message content can be conveyed with only minimal requirements for transmission of actual specific information.

As noted, a wide variety of information items can be stored as described. The following are a few illustrative examples:

Information regarding stocks;
Information regarding meetings;
Information regarding real estate transactions;
Information regarding airline flights/status;
Information regarding sporting events;
Information regarding weather forecasts/status
Information regarding system users;
Information regarding calls or call types;
Various greetings, conversational statements, and inquiries;
Information regarding any monitored individual, premises, or event; and so forth.

In the embodiments just described, the coded representations each correspond to only one item of informational content. It is also possible to have a given coded representation correspond to a plurality of individual items of informational content by providing an additional variable parameter that can, in combination with the coded representation, facilitate identifying only a single informational item. For example, and referring now to FIG. 7, a given code 71 can itself correspond to eight different items of information content. As noted earlier with reference to FIG. 2, control channel information (and hence service option fields) can be transmitted in any of a plurality of time division multiplexed slots. By correlating the information content items with both a particular code 71 and a particular time slot, a unique item of information content can thereby be identified.

For example, when this code 71 is transmitted during the first slot 72, the receiving unit can understand that a first information content item 73 is being identified. Similarly, when this code 71 is transmitted during a fifth time slot 74, a fifth information content item 75 is being identified.

In the example provided, up to eight items of information content can be correlated to each individual coded representation because there are eight time slots available by which to so differentiate the items of information content. This number can be adjusted accordingly to accommodate a greater or lesser number of time slots. In addition, it should be understood that time slots are being used in this example as an illustration of a particular relative station of transmission (or reception, depending upon one's point of view) and that other relative stations of transmission could be used. For example, a particular radio frequency carrier or orthogonal variable spreading code as used to facilitate a given transmission could be used in a similar fashion. It should also be clear that, when using time slots in this way, a given time slot can be identified by a particular unique sequence number (such as "slot 4"), by a slot offset value (such as "3" to identify slot 4, wherein the "3" indicates that the third slot after the first slot is being identified), or by any other convenient and accurate identifying mechanism or practice.

With a system configured as described above, and referring now to FIG. 8, it should be clear that the infrastructure can select 81 specific informational content intended for a particular user or group of users and then identify 82 a coded representation having a previously determined corresponding relationship to that specific informational content (along with identifying 83 a corresponding relative station of transmission if such a storage embodiment has been selected). The selected coded representation is then combined 84 with any appropriate service option indicia that may apply to complete configuration of the service option field, and service option field is then transmitted 85 to the intended recipient (the relative station of transmission being taken into account, of course, when again that embodiment is being followed).

Similarly, when such a transmission is received at a receiving unit, and referring now to FIG. 9, the service option field is received 91 and the coded representation extracted 92 therefrom (the relative station of reception is also determined 93 when that information is necessary to complete identification of the corresponding information content). The receiving unit then accesses 94 the previously stored information content that correlates to the coded representation (and relative station of transmission when applicable) and the recovered information then used accordingly. For example, textual portions of the recovered information can be displayed 95 and/or the information used to cause a corresponding annunciation.

Figure 10:
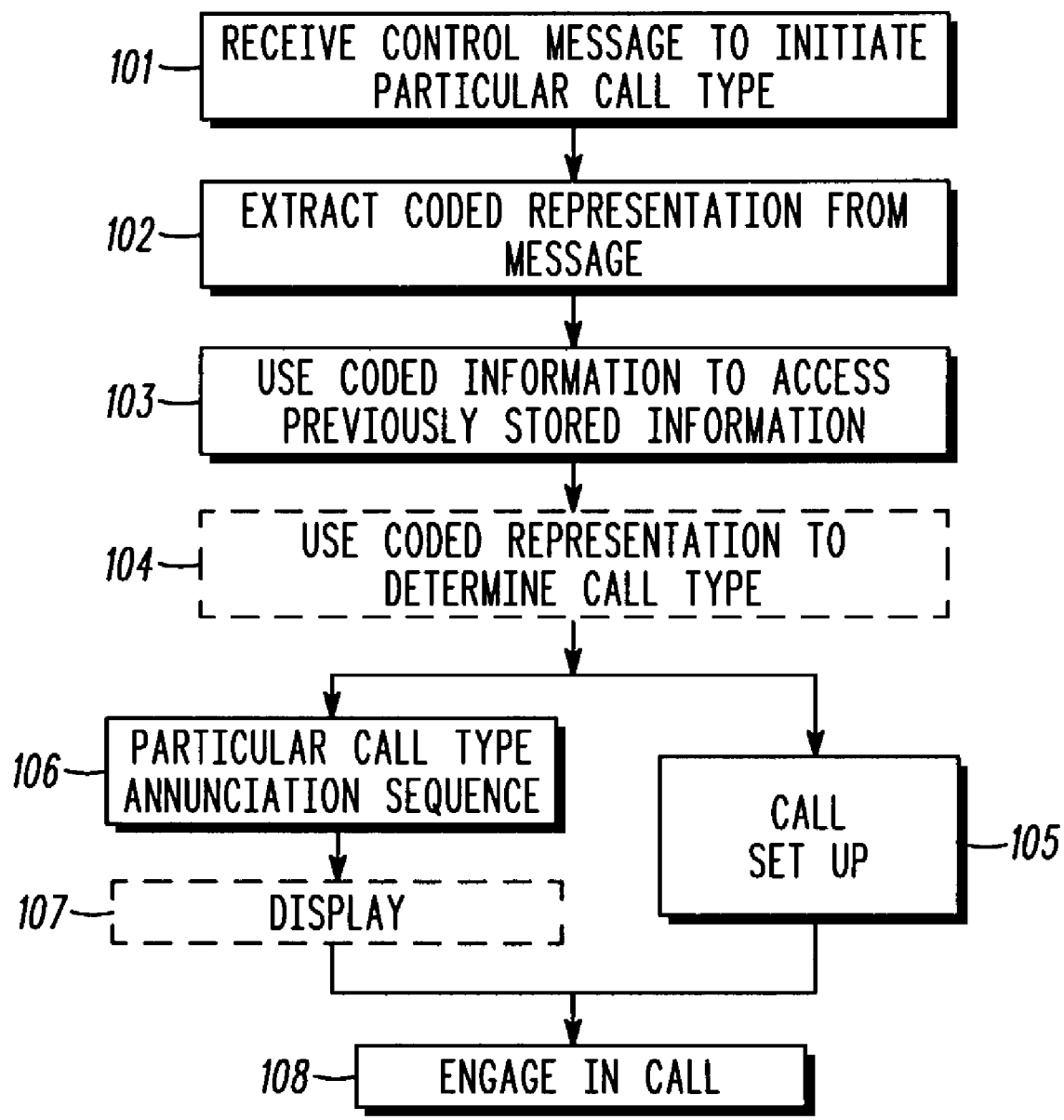
FIG. 10 comprises a flow diagram for receiving information as configured in accordance with various embodiments of the invention.

Referring now to FIG. 10, these embodiments can be used in additional ways to yield benefits beyond the data compression described above. In particular, such coded representations can be used to facilitate the early provision of specific kinds of information to a receiving party to thereby aid in influencing behaviors that are helpful to both the user and the system. For example, upon receiving 101 a control message to initiate a particular call type (as is presently done in numerous prior art systems), the receiving unit can extract 102 a coded representation as otherwise described above. This coded representation is again used to access 103 previously stored information (for example, if desired, the coded representation can correlate to a particular call type such that the receiving unit can determine 104 the call type of the call then being established at a point in time that is earlier than normal for that system). The receiving unit can then, at least partially in parallel, both engage in the ordinary call set up routine 105 (such as, for example, by moving to an assigned traffic channel and engaging in the handshake and other protocol elements that characterize that particular call type) while also annunciating 106 the particular call type that is then in the process of being established. A corresponding display of information can also be provided 107, if desired, such as a display of a telephone number or other information that identifies, for example, the identity of the party seeking to initiate the call. The call can then be engaged 108 in ordinary course.

The particular call type could be, as one example, a dispatch communication and the coded representation could include an identification of that call type. The receiving unit could use that call type information to cause provision of a unique audible sound that particularly identifies an initiating dispatch communication. The receiving unit, presuming that the coded representation also provided information that facilitated identifying the originating user, could also display a radio ID for the originating user and/or an alias that represents the user or the user's dispatch group.

The particular call type could also be, as another example, a telephone interconnect communication. The coded representation could be used to cause the provision of originator information such as a telephone number. The receiving unit could use this information for display purposes to facilitate presenting the caller ID even prior to the actual receiving unit being to ring in ordinary course (a special annunciation sound could be used here as well) to alert the receiving party that an interconnect call is in progress and that the display may be viewed in order to ascertain the identity of the calling party.

With such provisions, it can be seen that useful information regarding initiation of various calls can be made available to a receiving party even prior to the actual formal initiation of the call itself. This results because the brief interval during call set up can be used to send a small amount of data to the receiving party, which small amount of data serves to identify considerably more preexisting data as is stored at the receiving unit.

Through these various embodiments and configurations, system resources are leveraged to greater effect than has been generally possible in the past.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for signaling on a common channel between a base site and a mobile unit within a wireless communication system having an over-the-air common-air-interface that includes a service option field, comprising:

creating the service option field wherein some, but not all, of the service option field being for service option indicia, wherein the service option indicia to provide information specific to the common channel and using at least a part of a remaining portion of the service option field for non-service option information indicia, wherein the non-service option information indicia provides information other than being specific to the common channel, wherein using at least a part of a remaining portion of the service option field for non-service option information indicia includes using at least a part of a remaining portion of the service option field for providing a coded representation, wherein at least some of the coded representations each correspond to one of a plurality of unique information content;

sending the service option field on the common channel between the base site and the mobile unit;

selecting a particular message that includes specific informational content to impart to a user, and identifying a specific one of the coded representations and a specific corresponding time slot within which to transmit the specific one of the coded representations that, in combination, represents the specific information content.

2. The method of claim 1 wherein the over-the-air common-air-interface provides for inclusion of at least one of the service option fields for each of a plurality of corresponding time slots.

3. The method of claim 1 wherein the plurality of unique informational content includes at least some previously determined unique informational content.

4. The method of claim 3 wherein the previously determined unique informational content includes at least some textual content.

5. The method of claim 3 wherein the substantially unique previously determined informational content includes at least some identifying information that corresponds to users of the wireless communication system.

6. The method of claim 5 wherein at least some of the identifying information includes at least one of a telephone number, an email address, and an email subject header.

7. The method of claim 1 and further comprising:
receiving at the mobile unit a wireless communication tat the service option field;
extracting from the service option field the non-service option information indicia.

8. The method of claim 7 and further comprising using to non-service option information indicia to extract informational content as previously stored at the mobile unit that correlates to the non-service option information indicia.

9. The method of claim 8 and further comprising displaying at the mobile unit at least a portion of the informational content.

10. The method of claim 9 wherein displaying at least a portion of the informational content includes displaying at least a portion of at least one of a telephone number, an email address, and an email subject header.

11. The method of claim 8 wherein using the non-service option information indicia to extract informational content as previously stored at the mobile unit that correlates to the non-service option information indicia includes using information regarding when the wireless communication was received in combination with the non-service option information indicia to extract informational content as previously stored at the mobile unit that correlates to the non-service option information indicia.

* * * * *